United States Patent [19]
Webster

[11] Patent Number: 5,418,758
[45] Date of Patent: May 23, 1995

[54] DISTANCE MEASUREMENT SYSTEM

[75] Inventor: David J. Webster, New South Wales, Australia

[73] Assignees: Connell Wagner (Qld) Pty. Ltd., Queensland; University of Technology, Sydney, New South Wales, both of Australia

[21] Appl. No.: 119,088
[22] PCT Filed: Mar. 22, 1992
[86] PCT No.: PCT/AU92/00122
  § 371 Date: Dec. 6, 1993
  § 102(e) Date: Dec. 6, 1993
[87] PCT Pub. No.: WO92/16857
  PCT Pub. Date: Oct. 1, 1992

[30] Foreign Application Priority Data
  Mar. 22, 1991 [AU] Australia ............... PK5225

[51] Int. Cl.$^6$ .................. G01S 15/32; G01B 17/00
[52] U.S. Cl. ................................. 367/101
[58] Field of Search ................ 367/902, 99, 101, 2

[56] References Cited
U.S. PATENT DOCUMENTS

| | | | |
|---|---|---|---|
| 3,458,853 | 7/1969 | Daniels et al. | 367/2 |
| 4,313,183 | 1/1982 | Saylors | 367/101 |
| 4,543,649 | 9/1985 | Head et al. | 367/902 |
| 4,630,226 | 12/1986 | Tanaka | 364/561 |
| 4,677,599 | 6/1987 | Obayashi et al. | 367/99 |
| 4,831,604 | 5/1989 | McKnight et al. | 367/99 |
| 4,933,915 | 6/1990 | Boström | 367/99 |

FOREIGN PATENT DOCUMENTS

| | | |
|---|---|---|
| 336027 | 10/1989 | European Pat. Off. |
| 2569843 | 3/1986 | France |
| 55-131787 | 10/1980 | Japan |
| 63-98507 | 10/1986 | Japan |

Primary Examiner—Daniel T. Pihulic
Attorney, Agent, or Firm—Kerkam, Stowell, Kondracki & Clarke; Harold L. Stowell

[57] ABSTRACT

Apparatus and a method using ultrasonic signals to determine the distance between the displacement of two points in space. An ultrasonic distance measurement unit (1) generates frequency modulated ultrasonic waves using binary shift keying. The signals are transmitted by the transmitting transducer (2) towards a reflector assembly (30), preferably comprised of two reflectors (31, 32). One of the reflectors (31) is smaller than the other reflector (32), and the smaller reflector (31) is positioned in front of the larger reflector (32). The reflected signals are received by the receiving transducer (3). The unit (1) phase digitizes and processes the received signal by recording time stamps of zero-crossings of the received signal. The speed of sound may be determined by a temperature measurement system (5) and/or by measuring the transit time difference between the two reflectors (31, 32) of the assembly (30). The distance between the unit (1) and the assembly (30) can then be determined from the speed of sound and the time taken for an ultrasonic signal to travel between the unit (1) and assembly (30). Displacement of the assembly (30) relative to the unit (1) can be determined by making distance measurements over a period of time. The present invention has a number of applications, including measurement of roof convergence in underground mining.

12 Claims, 5 Drawing Sheets

DISTANCE MEASUREMENT SYSTEM

FIELD OF THE INVENTION

The present invention relates to a distance measurement system. More particularly, it relates to apparatus and a method for signal processing ultrasonic signals to determine the distance between and displacement of two points in space.

BACKGROUND ART

In various situations it is necessary to measure distances unobtrusively between two points (i.e. there must be no physical members connecting the points), or to measure changes in distances between the two points. It is often necessary for these measurements to be fully automated and to be made continuously or at regular intervals. One particular example where regular unobtrusive distance and displacement measurements are required, is in the underground mining industry. Underground mine shafts are prone to collapse, resulting in significant losses in productivity and possibly lives. Usually collapses of underground shafts are preceded by the convergence of the shaft roof and floor. By detecting this convergence, it is possible to predict impending shaft collapses, and thus allows mining operators to attempt to avoid a possible disaster.

It is preferable that such a divergence detection system should have a high degree of accuracy, reliability and repeatability under conditions which are adverse while being unobtrusive and easily transportable. Existing measurement systems include extensiometers, wire-wound potentiometers and laser interferometers.

Extensiometers and wire-wound potentiometers suffer from a number of limitations. They rely on an obtrusive measurement technique resulting in errors due to mechanical disturbances arising from the general nature of mining operations. They are often used only as temporary apparatus and have limited resolution. For these reasons they cannot be used in many areas where convergence measurements are required. Laser interferometry suffers from the fact that a relatively clean environment is necessary for correct operation. The environment within a mine is in direct conflict with this requirement. Furthermore, its cost make laser systems very undesirable.

The present invention attempts to overcome one or more of the above disadvantages with the use of ultrasonic waves, ultrasound. Ultrasound is comprised of travelling longitudinal mechanical waves at frequencies above those audible to the human ear, normally above twenty kilohertz. When travelling through air, the waves may be described in terms of the variation of air pressure at a particular point. The pressure varies with simple harmonic motion, firstly above and then below the average atmospheric pressure at that point. The reflection of ultrasonic waves from a plain surface is similar to the reflection of light from a non-ideal mirror. That is, the angle of reflection is approximately equal to the angle of incidence. This is especially true at high frequencies. However, as the frequencies decrease, more defraction and dispersion take place.

Distance between and displacement of two points in space can be measured using ultrasound measurements. By comparing distance measurements at different points in time, it is possible to detect relative movement between the points in space. In order to measure the distance between the points, an ultrasonic toneburst can be projected from one of the points using an ultrasonic transducer, the toneburst is reflected by a suitable reflector at the second point and the toneburst then returns to the point of transmission. The transit time of the pulse is proportional to the total distance travelled. It is critical to accurately measure the time between the transmission and reception of the toneburst, in order to provide an accurate measurement of the distance between the two points.

In order to complete the distance measurement it is necessary to have knowledge of the speed of the ultrasonic waves in air. This speed may vary depending on temperature, air pressure, moisture content, etc. If it is known that the speed of sound does not change in the application of the UDMS, then a constant value for the speed of sound may be used. Alternatively, if the speed of sound does change, then a measurement of the current speed of sound is required.

FIGS. 1 and 2 illustrate known ultrasonic distance measurement systems (UDMS). FIG. 1 shows a UDMS unit 1 at a first point in space having a transmitting transducer 2, a receiving transducer 3 and a reflector 4 at a second point in space. The UDMS use known methods to determine the time required for an ultrasonic signal to travel the unknown distance d1 between the two points in space. If it is known that the speed of sound is variable over time around the UDMS unit 1, the UDMS 1 may also be provided with a subsystem 5 for measuring the current temperature from which it is possible to determine the speed of sound. Using the transit time period required for a signal to travel between the two points and a fixed or measured value for the speed of sound, it is possible to calculate the distance d1 between the two points.

FIG. 2 illustrates a UDMS 1 having a subsystem 5 comprised of transmitting transducer 6 and receiving transducer 7 at a known distance d2 from each other. From a measurement of the transit time over the known distance d2 it is possible to calculate the speed of sound. From a measurement of the transit time between the UDMS 1 and the reflector 4, and the calculated speed of sound, it is possible to determine the distance d1 between the two points.

The intensity of an ultrasonic wave in air attenuates at approximately inverse parabolic function against distance travelled. Furthermore, the attenuation becomes more rapid at higher frequencies. It is for this reason that ultrasonic ranging systems use frequencies in the range 20 to 200 kilohertz when measurements greater than a few meters are required. These frequencies correspond to wave lengths of 70 millimeters to 1.7 millimeters, respectively, in air. At this point it should also be noted that the spacial intensity distribution is a direct function of the frequency being transmitted. Higher frequencies result in a reasonably directed output but suffer from rapid attenuation, whilst very low frequencies result in less attenuation but a much more hemispherical distribution from an ultrasonic transducer. It is a problem to find a particular operating frequency which has an acceptable degree of attenuation and directionality for reliable operation of a UDMS over a wide range of distances.

Ultrasonic transducer convert electrical impulses to mechanical ultrasonic waves upon transmission, and vice versa when they are received by the transducers. The most commonly available ultrasonic transducers are of a piezoelectric or electrostatic type. As with most transducers, these are not ideal. One of the most significant problems with transducers is that the transfer from electrical to mechanical, or mechanical to electrical waves, is not instantaneous.

The main problem with this is that the amplitude of the ultrasonic wave as it is transferred to air is not constant. Many cycles of the tone burst are required before the amplitude of the mechanical wave reaches its maximum. FIG. 3 illustrates a pulse 10 which is used to fire a transducer. The pulse 10 causes the transducer to produce an ultrasonic signal 17. As shown, the ultrasonic signal 17 has a rise period 11 before reaching its peak 12, and then a fall period 13 to a static level. This phenomenon is due largely to the inertia of the diaphragms in both the transmitting and receiving transducers. They cannot be brought to their maximum displacement immediately upon application of the firing pulse. In the same manner, the toneburst does not automatically cease upon the termination of electrical impulses. The amplitude generally decays in an exponential manner.

The known ultrasonic ranging methods are inadequate for mining industry requirements. The most common ranging method in pulse-echo ranging illustrated in FIG. 3. In this method a transmitting transducer is fired and the resulting ultrasonic signal 17 propagates away from the transducer, is reflected from an object, and is then received by the receiving transducer in an attenuated form 14. The time difference between the start of the signal at the transmitting transducer and the reception of the reflected signal is used to give an estimate of the distance between the transducer and the object. The receiving transducer is triggered when a pulse is received which is greater than a predetermined threshold 15. This is usually achieved within the first few wavefronts of the ultrasonic signal. As described above, the longer the distance travelled, the larger the attenuation of the received signal. Since the amplitude of the received signal is compared to a set threshold, and the received signal takes a number of cycles to build up to its maximum amplitude, the receiver will be triggered on different wavefronts, depending on the distance and reflection properties of the reflecting object. This results in a significant error in the measurement of the distance between the transducers and the object.

The variable gain method is a form of pulse echo ranging which partially reduces this error by varying the threshold or the gain of the receiving amplifier over time. By increasing the gain of the received signal over time, the attenuation is counteracted. This method alleviates the above error, but is not able to account for variations in intensity from other sources of amplitude variation, such as angle deviation errors and changes in reflection properties.

Another known method is the modulated carrier method. In this method an ultrasonic wave is continuously transmitted and is modulated by a lower frequency wave. The phase differences of the low frequency components at the transmitter and receiver are examined and is directly proportional to the straight line distance plus a constant. However, the method only has a usable distance measurement range of one wavelength of the low frequency component. This is always less than one meter in magnitude.

The final known ranging method uses linear frequency modulation (LFM). In this method a chirp is transmitted. The frequency is varied in a linear sweep from low frequency to high frequency. This chirp is received and mixed with the transmitting waveform to produce a relatively constant, difference frequency. The difference frequency is proportional to the distance measured. The main problems involved with this method is the limited bandwidth and non-linearity of the transducers resulting in reduced accuracy.

Further errors in measurement can occur due to false triggering from ultrasonic noise, constructive and destructive interference between the source and reflected ultrasonic waves, transducer bandwidth limitations and changes in velocity of the ultrasonic waves due to air temperature changes. In many applications, such as mining environments, further errors occur due to temperature changes in the air over the distance being measured and over time. Any reliable method for compensating a measurement system for changes in the speed of sound due to temperature variations may be used. A temperature transducer such as a thermistor or thermocouple can be used. The correct speed can then be calculated for the temperature of the environment when the measurement is made. Such a configuration was discussed ablove and shown in FIG. 1. Whilst this method is desirable in its simplicity, a significant problem arises if the air temperature is not homogeneous. That is, if the temperature varies significantly over the distance being measured, then significant errors can result in the measured distance.

The present invention attempts to overcome one or more of the above problems.

SUMMARY OF THE INVENTION

According to the present invention there is provided a method of measuring the distance between a first point and a second point in space, comprising the steps of:
  generating and frequency modulating an ultrasonic signal using binary frequency shift keying,
  transmitting the modulated signal from the first points towards the second point,
  reflecting the transmitted signal at the second point back towards the first point,
  receiving the reflected signal at the first point,
  processing the received signal, including phase digitising the received signal by recording zero-crossing transitions of the received signal, and
  analysing the recorded transitions so as to determine the distance between the first point and the second point.

It is to be understood that the transmitted signal and received signal may not be transmitted and received from exactly the same point in space, but they are transmitted and received close to each other.

According to the present invention there further provides an apparatus for measuring the distance between a first point and a second point in space, comprising:
  an ultrasonic signal generator at the first point for producing, in use, a frequency modulated ultrasonic signal using binary frequency shift keying and transmitting the modulated signal,
  a reflector at the second point capable of reflecting the transmitted signal,
  a receiver capable of receiving the reflected signal,
  signal processing means capable of processing and analysing the received signal so as to calculate the distance between the first and the second points in space by phase digitising the received signal, recording zero-crossing transitions of the received signal and analysing the recorded transitions.

According to another aspect of the present invention there is provided a dual reflector system comprising a first reflector and a second reflector, the first reflector having a larger reflecting surface than the second reflector, and the second reflector being positioned in front of the first reflector at a fixed reference distance from the first reflector, wherein the reflector system is capable of reflecting a wave incident on the reflectors to produce two reflected waves travelling parallel to each other at a separation distance from each other, such that the speed of the waves is capable of being determined from the separation distance and the reference distance.

DESCRIPTION OF THE DRAWINGS

Preferred embodiments of the present invention will now be described, by way of example only, with reference to the accompanying drawings, in which.

DESCRIPTION OF PREFERRED EMBODIMENTS

The method of the preferred embodiment of the present invention employs frequency modulation (FM) of the ultrasonic waveform with binary coding to produce a frequency shift keyed signal. When a distance between two points in space are to be measured, a frequency shift keyed signal is transmitted from one of the points, reflected off a reflector at the second point, and received at the first point. By measuring the transit time of the frequency shift keyed signal between the two points, it is possible to determine the distance between the two points, since the transit time is propostional to the distance travelled. Using the transit time and the speed of the ultrasonic signal, it is possible to calculate the distance.

Figure 4:
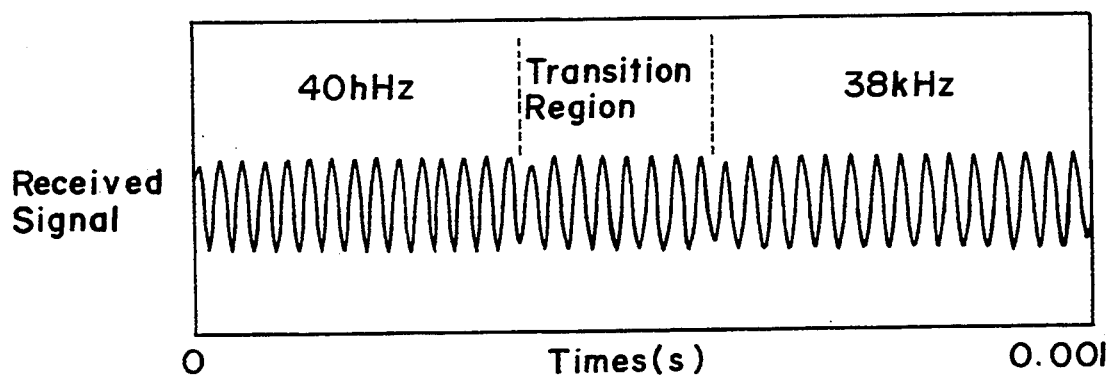
FIGS. 4 to 7 are graphs illustrating a preferred embodiment of the method according to the present invention.

Frequency shift keying (FSK) is a form of frequency modulation where the frequency transmitted changes from a carrier frequency, F1, instantaneously to a second frequency, F2. In the example of the preferred embodiment, the two frequencies are F1=40 kHz and F2=38 kHz. Note that these values are not critical, but should be stable for proper operation. The only limitation is in the range of frequencies that may be used which is within the bandwidth of the transducers. Although the electrical input changes instantaneously from frequency F1 to frequency F2 at the transmitting transducer, the mechanical output, i.e. the ultrasound waves, cannot instantaneously change, and so a transient occurs resulting in a smooth transition of frequencies from F1 to F2. This normally has a duration of a few cycles. FIG. 4 is a graph of a modulated wave which has been received by a receiving transducer. This FSK wave has a slow transition from 40 kHz to 38 kHz in the middle of the graph.

Figure 5:
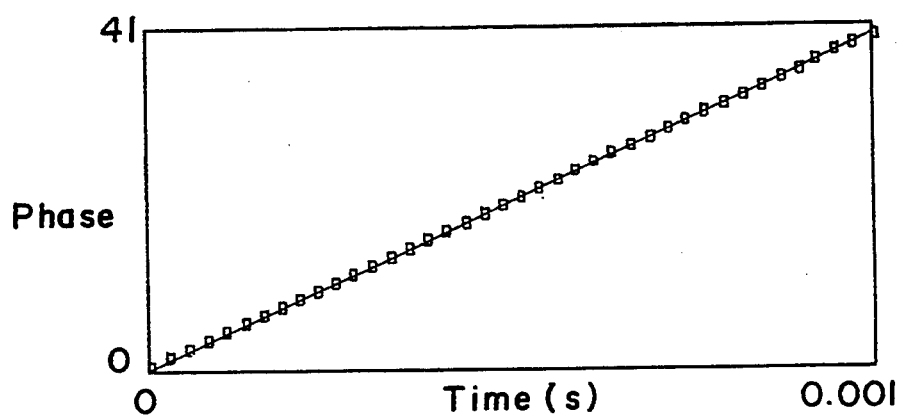

In the UDMS of the preferred embodiment of the present invention the FSK signal having the change in frequency is transmitted by a transducer at the first point in space, the signal is reflected at the second point in space, and the signal is received by a transducer at the first point in space. The UDMS digitises the received signal by recording the time stamps of the negative-going zero-crossing transitions of the received signal. That is, the received signal is digitised by storing a time stamp for every 360 degree phase change of the received signal. It is to be appreciated that it is possible to record time stamps of the positive-going zero-crossings instead of the negative-going zero-crossings. This method eliminates any problems resulting from amplitude variations of noise. FIG. 5 is a graph of recorded zero-going negative-transition events against time. Note that the transition between the 40 kHz and 38 kHz frequencies cannot be clearly seen.

Figure 6:
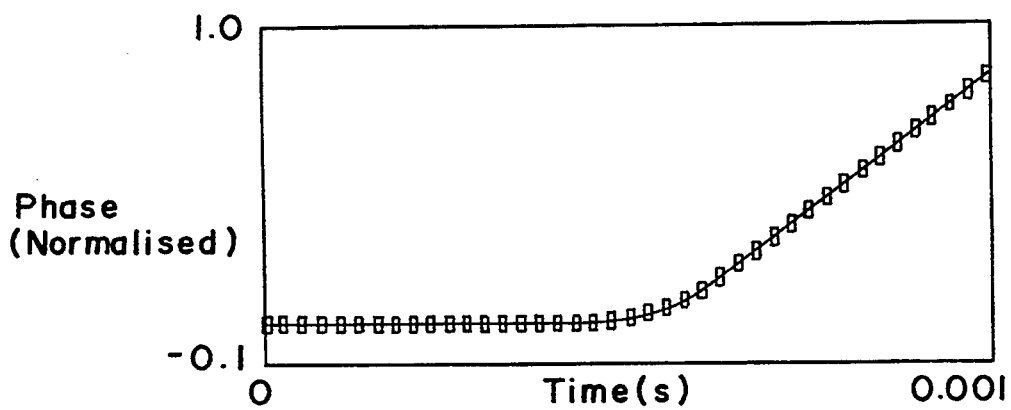
Figure 7:
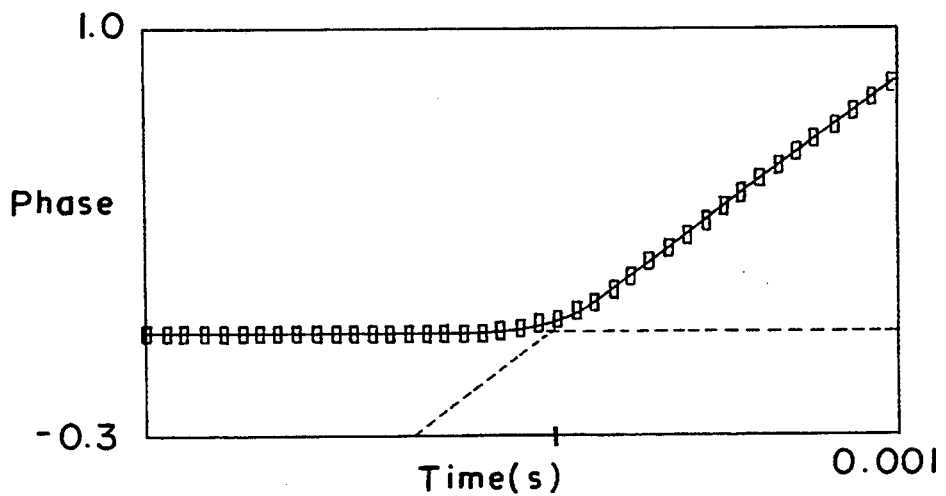

In order to extract the relevant data of the transition from the above graph, it is necessary to subtract a graph representing the carrier wave of 40 kHz. The result of this subtraction is a normalised graph which is illustrated in FIG. 6. It clearly shows the difference between the transmitted frequencies. The slope of the 40 kHz section is 0, while the slope of the 38 kHz section is 2000, that is, the difference in slope equals the difference between the two frequencies. Now, using this graph, a line of best fit is found using the 38 kHz data points only. This process is simplified by the fact that the slope of the 38 kHz section is known. A second line of best fit is found for the 40 kHz section. This line is horizontal, see FIG. 7. A least square error method may be used to find the lines of best fit for the data points. The magnitudes of the least square errors for the lines give an indication of the total error in the calculation of the distance between the two points. The time of the transition between the two frequencies is found from the intersection of the two straight lines. The distance between the first and second points can then be found by multiplying the calculated transit time of the signal with the speed of sound in the medium. The speed of sound may be a known constant or may be calculated from the temperature measurement subsystem or reference link(s) as described below. This method of determining the distance between the points can be fully automated using a micro-processor system.

The analysis is based on phase information only. Thus, only steady state information is relied upon. No information is used which is derived from transient waveforms. This is in direct contrast to previous methods of ultrasonic detection which only look at transient data. These methods are open to errors resulting from variability of circuit elements, transducers and the characteristics of the transition medium. In contract, the use of steady state information results in significantly less sensitivity to errors due to the above sources, since the output of the receiver is virtually identical to the forcing function. The method of the preferred embodiment is particularly advantageous since it is isolated from unwanted amplitude distortions, attenuation problems and environmental variations.

For the ultrasonic distance measurement system (UDMS) to work reliably it is preferred that the system has means to process signals so that false readings do not occur when vehicles, materials or personnel momentarily obstruct the measurement path. In addition if the UDMS is to be accurate in an industrial environment, it may also have an ability to reject noise that inevitably arises from electrical and mechanical sources. To achieve such immunity the UDMS of the preferred embodiment may employ signal processing techniques using a micro-processor. Furthermore, a micro-processor also enables the UDMS to interface with communications systems used throughout mines and industrial plant so that remote monitoring may be easily achieved.

In the preferred embodiment of the present invention spurious errors in determining the distance between the two points are eliminated by analysing the received signal in various ways. Firstly, a single distance calculation is done by sending a plurality of modulated signals at regular time intervals. Each reflected signal is received and must meet predetermined noise, phase, and timing error bounds. For example, a plurality of pulses are transmitted at 100 millisecond intervals. Only once 32 valid reflected pulses are received is the distance calculated. A further error reduction method uses to eliminate errors resulting from interference or movement of people and equipment between the first and second points, involves the use of a "distance window". The plurality of valid readings obtained above are analyzed by placing a, for example, 2 millimeter "window" over the readings. All distance readings outside the "window" are rejected as invalid readings. The final calculation of the distance between the two points are then made using the average of the windowed readings.

Figure 1:
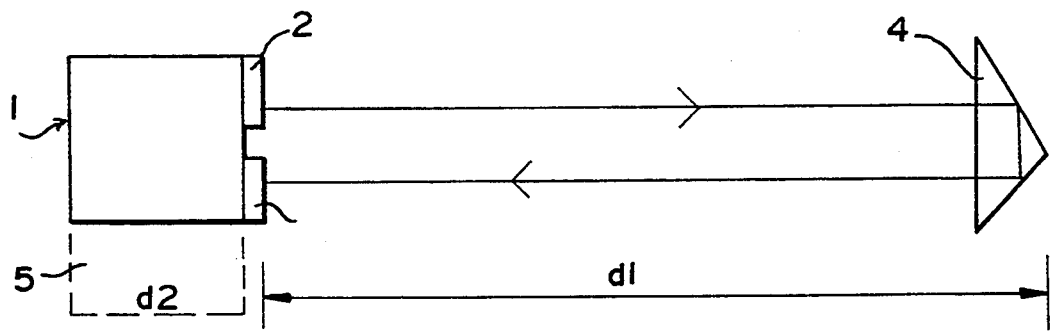
FIGS. 1 and 2 illustrate a known ultrasonic distance measuring systems (UDMS)
Figure 8:
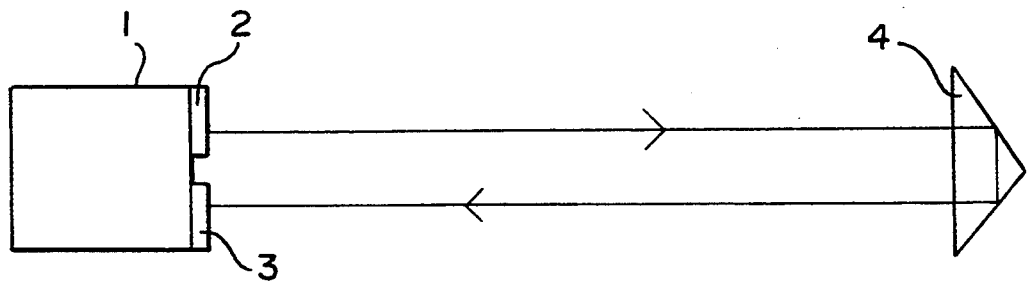
FIGS. 8 & 9 illustrate preferred embodiments of the apparatus system in accordance with a preferred embodiment of the present invention.

A system similar to the known ultrasonic distance measurement system of FIG. 1 may be used in implementing the above methods. See FIG. 8. The single reflector 21 provides adequate reflection of the ultrasonic signals, while the main UDMS unit 20 contains the signal processing means to implement the method of the preferred embodiment of the present invention. The intelligence resulting from the use of micro-processor technology may be used for local display of measurements by a variety of means. For example in one preferred embodiment, different coloured lights can be illuminated to indicate the current convergence rage, e.g. Green—to indicate no significant convergence; Amber—to indicate convergence in occurring; Red—to indicate significant convergence is occurring and remedial actions is needed. The set point for indication being programmed when installed. In another embodiment the UDMS may also incorporate an alpha-numeric display which can be interrogated to display the historical distance changes and rate of convergence. Either the lights or numeric display can be used depending upon the location of the unit.

Due to the lightness and compactness of the UDMS, achieved by using advanced technology for signal processing, the unit can be easily installed in all locations underground. The UDMS is designed to be generally attached to the roof such as by attachment to a roof bolt, with the reflector on the floor or low on the rib, or wall. This is to minimise risk of damage to the main unit.

The UDMS may also be integrated with a computer system, either at the installation location or at a remote site. Distance and convergence information can thus be communicated from the UDMS's micro-processor to the computer system for further processing.

Figure 2:
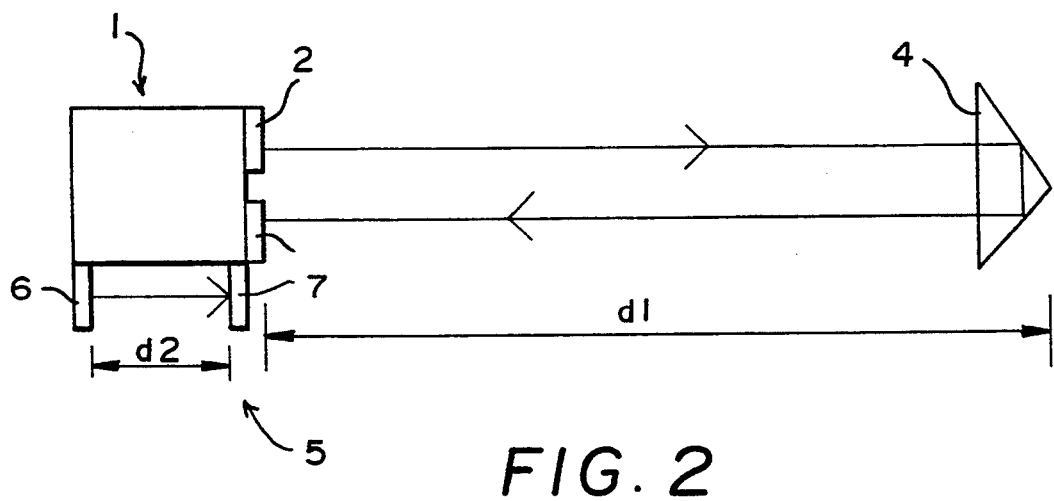
Figure 3:
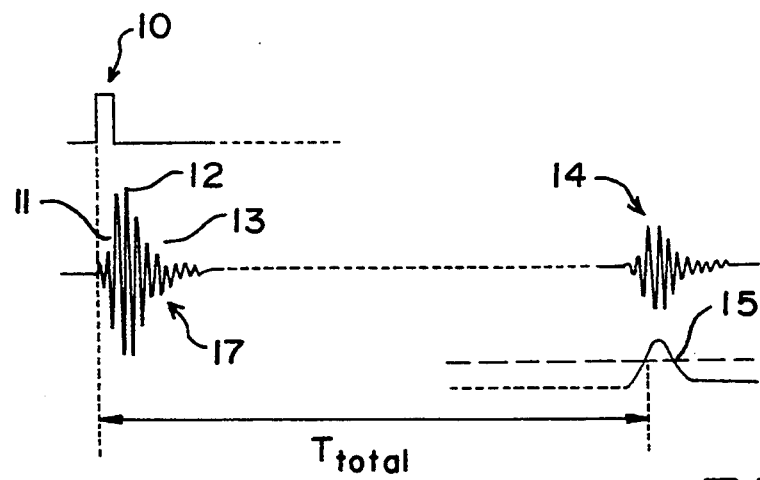
FIG. 3 illustrates the known method of pulse-echo ranging.

Using the single reflector is sufficient if the speed of sound is constant over time. If it is not constant, then in accordance with another preferred embodiment, a temperature measurement subsystem or reference link is used to determine the speed of sound. A known temperature measurement system as shown in FIGS. 1 or 2 may be used. However, if there exist a significant temperature difference between the first and second points, the construction of FIG. 1 or FIG. 2 is inadequate since it only takes into account the temperature at the main UDMS unit. A known reference distance is also required at the reflection point if the temperature at the reflection point is likely to be different to that at the main unit.

Figure 9:
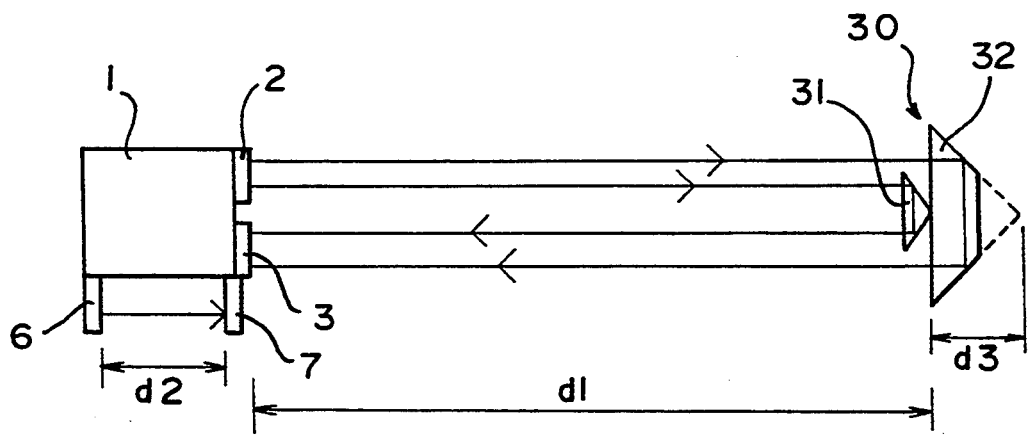
Figure 10:
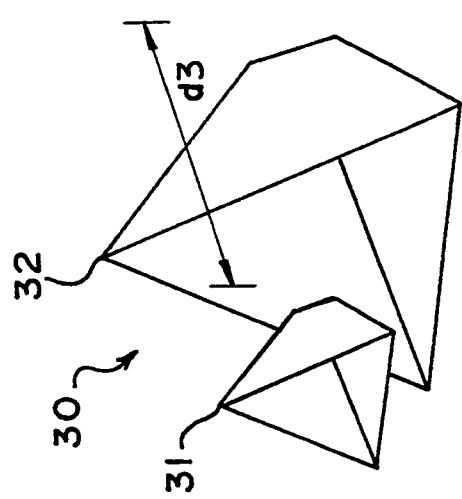
FIG. 10 illustrates a preferred embodiment of the reflector system of the present invention.

FIG. 9 illustrates another preferred embodiment of the present invention, in which a known reference distance d3 is provided at the point of reflection. The reference distance is formed by using two reflectors 31 and 32 connected to each other to form of dual reflector assembly 30. The assembly 30 may be implemented using tri-plane reflectors, as illustrated in FIG. 10. The tri-plane reflector is comprised of three triangular surfaces connected to each other at the edges of the surfaces to form a cone-shaped reflector. Reflectors having more than 3 surfaces may also be used. Using the principles of the tri-plane reflector, the apparatus can be compacted by placing the smaller tri-plane reflector 31 within the larger tri-plane reflector 32. The two reflectors are firmly secured to each other in order to provide a fixed reference distance d3. The reference distance is set by the distance between the apexes of the reflectors (or where the apexes would have been if the existed). Using this arrangement ultrasonic signals are reflected off both reflectors whilst travelling on almost the identical path.

A wave incident on the dual reflector system is reflected off the internal surfaces and returns to the transmitter in such a manner that the reflected wave is parallel to the incident wave. The total distance travelled by the wave, although reflected at different places within the reflector, is constant. The distance travelled inside the reflector is twice the distance from the open face of the reflector to the apex. Consequently, the total distance travelled by a wavefront from the transmitter to the reflector and back again equals twice the distance between the transmitter and the apex of the reflector.

The speed of sound at the dual reflector system is calculated by measuring the difference in time taken for signals to be reflected off the two reflectors. This is done by measuring the time taken for a signal travel between the UDMS unit 1 to the first reflector 31, and for a single to travel between the UDMS unit 1 and the second reflector 32. The difference in these times provides the time taken for a signal to travel between the two reflectors 31 and 32. Since the distance d3 between the two reflectors is known, it is then possible to determine the speed of sound at the reflector system. By averaging the speed of sound at the subsystem 5 and the reflector system 31, 32, it is possible to estimate an average speed of sound along the path between the UDMS unit 1 and the reflector system 31, 32.

The timing measurement is performed by examining the received demodulated binary FSK signal and comparing it to a preset threshold level, resulting in a digital output representing 40 kHz or 38 kHz. The first digital transition occurs at the time at which the pulse from the first reflector is received. The second digital transition occurs at the time when the signal reflected by the second reflector is received. The absolute accuracy involved with this process is relatively poor due to variations in transient behaviour for various system components. However when dealing with the timing difference between the two reflected pulses, any variation in absolute accuracy affects the timing of each of the two received signals equally. Thus, the measurement of the time difference for d3 can be made quite accurately. Care should be exercised to ensure that any temperature gradient present in the measurement environment is severe enough to require the implementation of the second reference subsystem. Otherwise, performance of the UDMS may actually be reduced due to the granularity introduced by the timing measurement of the second path. If little or no temperature gradient is present, then only the reference subsystem located at the main unit should be used.

An important advantage arises from the existence of two received pulses instead of one. A major problem in ultrasonics is the verification of the received pulse. It is relatively easy to verify the existence of a received pulse resulting from the transmitted pulse of the UDMS, purely from the characteristics of the received pulse (ie. it should be easily distinguishable from other external ultrasonic sources of noise). However, if the transmitted pulse is reflected not only by the placed reflector, but from other objects near the transmission path errors may occur. The only practical method is to examine the amplitude/frequency/phase/signal to noise characteristics of the received pulse and make a decision as to whether it seems to have been reflected from the known reflector. Now that two reflectors are present, a much more reliable method of reflected pulse verification may be used. Upon the reception of the first received pulse, it is known that a second pulse is to be expected within a relatively small time window after the first pulse. If a second pulse does not arrive when expected, it is a reasonable indication that the first pulse was from an unexpected source and can be discarded. This is an important advantage over the known systems.

The normal positioning of the reflector when measuring roof height is for the ultrasonic transducer to be placed on the roof and the reflector on the ground. The size of the reflector may be varied, but ranges of 50 to 120 mm from the apex to the open face may be used.

The reflector, being of a tri-planar design which may be provided with a hole at the apex which would allow dust and small rocks to fall through the reflector, thus preventing inaccuracies through contamination of the reflector pair.

Figure 11:
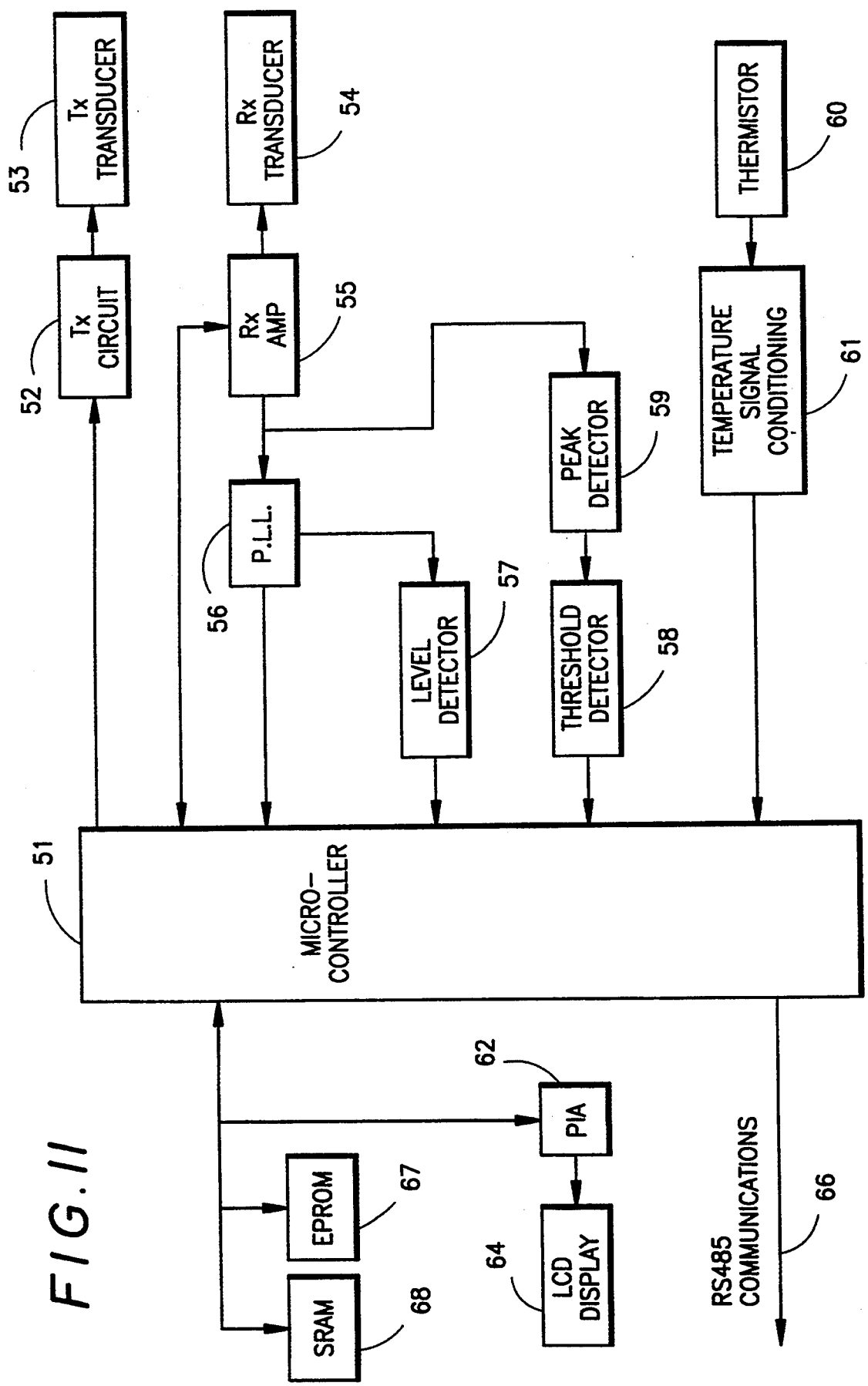
FIG. 11 is a block diagram of the apparatus according to a preferred embodiment of the present invention.

FIG. 11 is a block diagram of a preferred embodiment of the electronic components of the UDMS unit of the present invention.

According to the preferred embodiment there is provided a general purpose micro-processor 51 which controls the operation of the UDMS unit and processes the distance measurements and temperature measurements to determine the distance between the UDMS unit and the reflector. The micro-processor 51 is connected to a transmission circuit 52 which receives FSK modulated digital signals from the micro-processor and performs level shifting and buffering of the digital input signal in order to deliver a signal of adequate power to the transmitting transducer 53 for transmission to the reflector. Once the FSK signals are reflected from the reflector they are received by a receiving transducer 54 which is connected to a receiver amp 55. The receiver amp 55 amplifies the signal receives by the receiving transducer 54. The receiver amp 55 is also connected to the micro controller 51, which controls the gain of the receiver amp.

The amplified signal from the receiver amp 55 is sent to a phase locked loop (PLL) 56 which filters the incoming FSK waveform and produces a clean digitized form which can be fed to the micro controller 51. The phase locked loop 56 is connected to the micro-processor 51 and provides a digital equivalent of the FSK modulated signal received by the receiver transducer 54 to the micro-processor 51. The phase locked loop 56 is also connected to a level detector 57 and the phase lock loop 56 provides a demodulated analog signal which varies between two discrete DC level voltages representing each of the two frequencies used in the modulation. The level detector 57 converts the analog demodulated signal to a digital signal which is communicated to the micro-processor 51.

The receiver amp 55 is also connected to a peak detector 59 which converts the signal from the receiver amp 55 to produce an envelope of the signal. The peak detector 59 is connected to a threshold detector 58 which produces a digital output representing the amplitude of the envelope of the received signal. The threshold detector 58 warns the micro controller 51 of an incoming signal which is to be analysed.

The preferred embodiment also provides a thermistor 60 which determines the temperature and is connected to a temperature signal conditioning unit 61 which provides a digital output of the current temperature to the micro-processor 51. From this measurement it is possible for the micro-processor 51 to calculate the current speed of sound. Alternatively, the speed of sound may be calculated using the reflector system described above, in which case the thermistor is not required.

The micro controller 51 is connected to an EPROM 67 in which the controlling program of the micro-processor 51 is stored. The micro-processor 51 is connected to a RAM 68 for storing any data used in measuring the distance. The micro controller 51 is also connected to a peripheral interface adaptor 62 which is connected to an LCD display for displaying a measured distance or to warn of impending collapses. The peripheral controller 51 mat be provided with a communications line 56 for communicating with another computer system. For example, the micro-processor 51 may be under control of a larger computer which is connected to a number of UDMS units, and the computer can thus instruct various UDMS units to make measurements of convergence and to process the information for further use.

The UDMS may be used in a variety of applications. Due to the non-intrusive nature of the above described ultrasonic measurement system, it is possible to employ the system in locations where there would be considerable risk of damage if conventional extension meters were used. For example, UDMS can be installed in underground roadways, without disruption to the movement of vehicles. This can be achieved by attaching the unit to the roof (using an existing roof bolt) and placing the reflector against the rib or side, where it will not be damaged by vehicle or pedestrian traffic. Similarly, the UDMS can be placed to monitor movement where important equipment is located but is often unattended and hence if convergence occurs it would not normally be detected until a roof fall occurs. Examples include conveyor drives, pumping stations and substations where a roof fall at any of these locations would cause significant loss of production and expensive equipment damage. The present invention has particular application in the mining industry. It may be used in long wall mining situations and in mine openings and access shafts. When used, for example, in an access shaft, the main unit containing the electronic components and transducers is positioned on the roof while either a single or dual reflector is placed on the floor.

Figure 12:
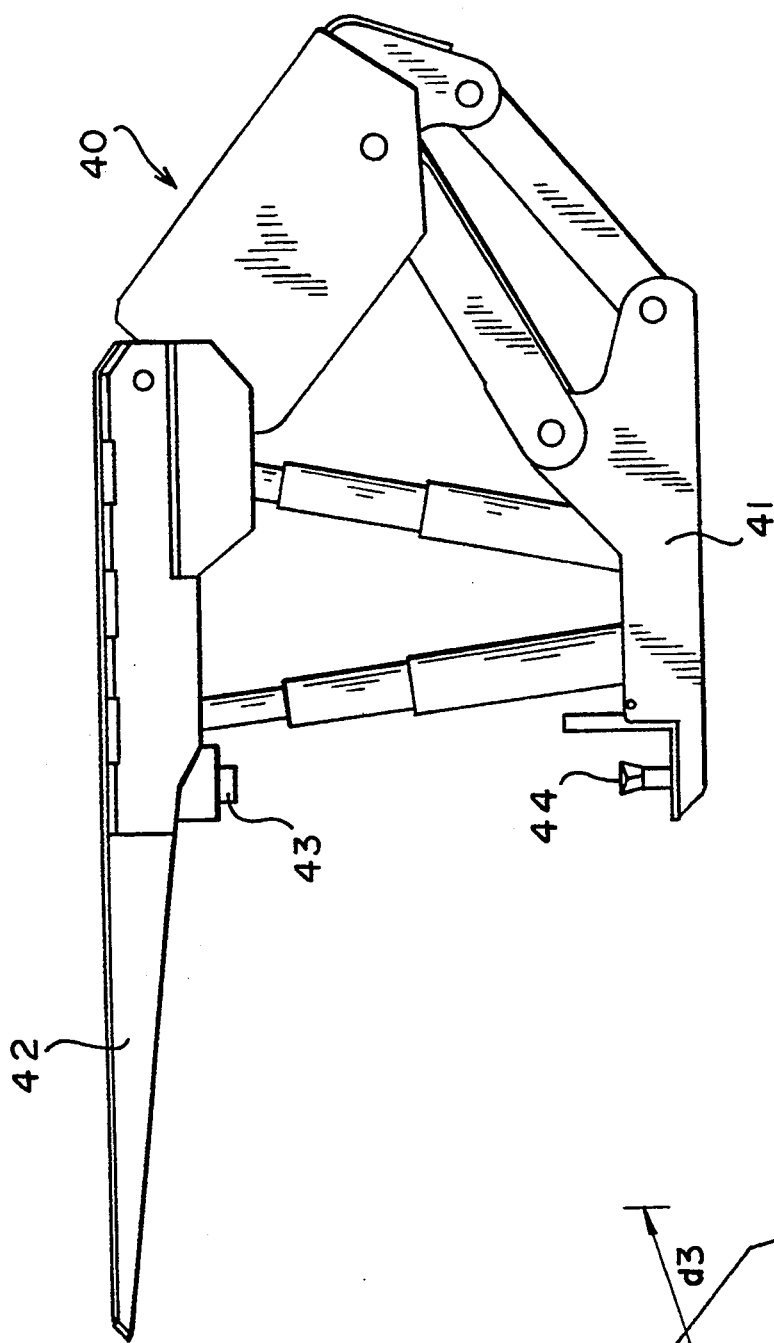
FIG. 12 illustrates an application of the preferred embodiment.

FIG. 12 illustrates a typical arrangement for installation in a long wall mining application. A long wall shearer (not shown) is used to excavate a shaft in the long wall mining process. A roof support 40 is used to support the roof of the excavated shaft. The roof support 40 has a base 41 and a roof supporting member 42 which helps to prevent the roof of the shaft from collapsing. A UDMS unit 43 is attached to the supporting member 42 and the reflector 44 is attached to the base 41. In such an application the UDMS measures the distance or convergence of the member 42 to the base 41, which is virtually the same as the convergent of the roof and floor. By detecting convergence of the member 42 and the base 41 it is possible to detecting convergence of the shaft roof an floor which may preceed a collapse. Once convergence is detected the unit 43 can warn the mining operators to take remedial action to prevent a total collapse. Due to the small size of the UDMS and reflector, a unit can be installed on each powered roof support, of which there may be 150 side by side, so that a profile of the convergence across the full face of the long wall can be monitored with out adversely affecting access in an around the long wall system. In such an application convergence monitoring will allow prediction of impending roof problems, and result in significant reduction in lost production due to unexpected roof movement.

It will be appreciated that features of the above invention may be varied for different applications. The foregoing description of the embodiments of the invention have been presented for purposes of illustration only. It is not intended to be exhaustive or to limit the invention to the embodiments, and many variations and modifications will be obvious to one skilled in the art.

I claim:

1. A method of measuring the distance between a first point and a second point in space, comprising the steps of:
   generating and frequency modulating an ultrasonic signal using binary frequency shift keying,
   transmitting the modulated signal from the first point towards the second point;
   reflecting the transmitted signal at the second point back towards the first point;
   receiving the reflected signal at the first point, and
   phase digitising the received signal by recording data pairs comprising time and place of zero-crossing transitions of the received signal, and
   analysing the recorded transitions in a domain using only the time and phase data so as to determine the distance between the first point and the second point.

2. A method according to claim 1, wherein the frequency modulation of the ultrasonic signal using the frequency shift keying comprises the step of changing the ultrasonic signal from a first carrier frequency to a second carrier frequency, at a first point in time.

3. A method according to claim 2, wherein the recorded transitions are analysed to determine a second point in time at which the received signal changes from the first carrier frequency to the second carrier frequency, thereby providing a time measurement for the travel time from the first point in space to the second point in space.

4. A method according to claim 3, further comprising the step of determining the speed of sound proximate to the first point in space, wherein the speed of sound and the time measurement is used to determine the distance between the first and second points in space.

5. A method according to claim 4, wherein the speed of sound is determined along a path between the first and second points in space so as to compensate for changes in the speed of sound due to changes in temperature at and between the first and second points in space.

6. A method according to claim 4, wherein the speed of sound proximate the second point in space is determined by further reflecting the transmitted signal off a third point in space which is at a fixed known distance from the second point in space, receiving both the signals reflected from the second and the third points in space at the first point in space, and analysing both the reflected signals to determine the speed of sound proximate the second point.

7. A method according to claim 1, wherein the received signal is further processed to eliminate spurious errors in the received signal, thereby reducing incorrect determinations of the distance between the first and the second points in space.

8. A method of measuring the distance between a first point and a second point in space, comprising the steps of:
   generating and frequency modulating an ultrasonic signal using binary frequency shift keying by transmitting a first signal segment having a first frequency followed by a second signal segment having a second frequency, where the transition from the first frequency to the second frequency occurs at a time $t_o$;
   transmitting the modulated signal from the first point towards the second point;
   reflecting the transmitted signal at the second point back towards the first point;
   receiving the reflected signal at the first point and digitising the received signal by recording data pairs comprising the time and phase of the received signal at zero-crossing transitions of the received signal; and
   analysing the recorded transitions so as to determine the distance between the first point and the second point by processing the data pairs of the phase of the received signal against time by:
   (a) finding a first line of best fit for data pairs corresponding to the first signal segment,
   (b) finding a second line of best fit for data pairs corresponding to the second signal segment, and
   (c) finding the point of intersection of the first and second lines of best fit;
   whereby the time of the intersection of the first and second lines of best fit corresponds to the transition time of the ultrasonic signal from time $t_o$.

9. An apparatus for measuring the distance between a first point and a second point in space, comprising:
   an ultrasonic signal generator at the first point for producing, in use, a frequency modulated ultrasonic signal using binary frequency shift keying and transmitting the modulated signal,
   a reflector at the second point capable of reflecting the transmitted signal, a receiver at the first point capable of receiving the reflected signal, signal processing means for phase digitising the received signal by recording data pairs comprising time and place of zero-crossing transitions of the received signal and for analysing the recorded transitions in a domain using only the time and phase data so as to determine the distance between the first point and the second point.

10. An apparatus according to claim 9, wherein the signal processing means is capable of determining a time measurement for the transmitted signal to travel from the first to the second points in space.

11. An apparatus according to claim 10, further comprising means for determining the speed of sound proximate the generator, wherein the determined speed of sound and the time measurement is used to calculate the distance between the first and the second points in space.

12. An apparatus according to claim 11, further comprising means for determining the speed of sound proximate the reflector, wherein the determined speed of sound proximate the reflector and proximate the generator are used with the time measurement to calculate the distance between the first and the second points in space.

* * * * *